(12) United States Patent
Fujii

(10) Patent No.: US 11,023,253 B2
(45) Date of Patent: Jun. 1, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Masaru Fujii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 190 days.

(21) Appl. No.: 16/028,777

(22) Filed: Jul. 6, 2018

(65) Prior Publication Data

US 2019/0026127 A1    Jan. 24, 2019

(30) Foreign Application Priority Data

Jul. 21, 2017    (JP) .............................. JP2017-141454

(51) Int. Cl.
*G06F 8/61* (2018.01)
*G06F 9/445* (2018.01)

(52) U.S. Cl.
CPC ............ *G06F 9/44505* (2013.01); *G06F 8/61* (2013.01)

(58) Field of Classification Search
CPC ...... G06F 8/61; G06F 9/44505; G06F 9/4411; G06F 9/445; G06F 3/1288; G06F 3/1292
See application file for complete search history.

(56) References Cited

U.S. PATENT DOCUMENTS

| | | | |
|---|---|---|---|
| 2014/0189170 A1* | 7/2014 | Takigawa | G06F 13/12 710/40 |
| 2015/0067671 A1 | 3/2015 | Kamiya | |
| 2016/0034269 A1* | 2/2016 | Furuichi | G06F 8/65 717/169 |
| 2017/0160995 A1* | 6/2017 | Fukasawa | G06F 3/1204 |

FOREIGN PATENT DOCUMENTS

| | | |
|---|---|---|
| JP | 2002-287924 A | 10/2002 |
| JP | 2014-164743 A | 9/2014 |
| JP | 2014-192841 A | 10/2014 |
| JP | 2015-046075 A | 3/2015 |

\* cited by examiner

*Primary Examiner* — Duy Khuong T Nguyen
(74) *Attorney, Agent, or Firm* — Oliff PLC

(57) ABSTRACT

An information processing apparatus includes an extraction unit, an acquisition unit, and a presentation unit. The extraction unit extracts pieces of characteristic information of an initialization target program to be installed and initialized. The acquisition unit acquires at least one set value for initializing the initialization target program from at least one different program that has been installed. The acquisition unit acquires the set value in an ascending order of priorities assigned to the multiple different programs in accordance with a degree of matching in the pieces of characteristic information extracted by the extraction unit. The presentation unit presents the set value acquired by the acquisition unit.

12 Claims, 18 Drawing Sheets

FIG. 4

| EXTRACTION CONDITION NO. | EXTRACTED CHARACTERISTIC INFORMATION | CHARACTERISTIC-INFORMATION CLASSIFICATION ITEMS | EXTRACTION METHOD | APPLICATION AVAILABILITY |
|---|---|---|---|---|
| 1 | JOB FUNCTION | COPY, PRINT, SCAN, FAX, ... | APP NAME ANALYSIS JOB LOG ANALYSIS SOURCE CODE ANALYSIS | AVAILABLE |
| 2 | SETUP CONFIGURATION | STANDARD-INSTALLED APP AND ADD-ON APP | LAYER STRUCTURE ANALYSIS SOURCE CODE ANALYSIS | AVAILABLE |
| 3 | COMMUNICATION DESTINATION | PC, EMAIL, CONFIDENTIAL BOX, CLOUD, MFP, ... | SOURCE CODE ANALYSIS | AVAILABLE |
| 4 | ACCESS METHOD | SOAP, REST, XMLRPC, ... | JOB LOG ANALYSIS SOURCE CODE ANALYSIS | UNAVAILABLE |
| ... | ... | ... | ... | ... |

FIG. 9

| SETTING ITEM | PRIORITY |
|---|---|
| COLOR SETTING | 3 |
| RESOLUTION | 4 |
| GENERATED DOCUMENT FORMAT | 2 |
| QR CODE ANALYSIS | 1 |
| TRANSFER DESTINATION | 5 |
| ⋮ | ⋮ |

FIG. 12

| APP NAME | APP CHARACTERISTIC | | | | MATCHES WITH INITIALIZATION TARGET APP |
|---|---|---|---|---|---|
| | JOB FUNCTION (CHARACTERISTIC) NO. 1 | SETUP CONFIGURATION (CHARACTERISTIC) NO. 2 | COMMUNICATION DESTINATION (CHARACTERISTIC) NO. 2 | OTHER CHARACTERISTICS | |
| ZZZ SCAN (INITIALIZATION TARGET APP) | SCAN | ADD-ON APP | EMAIL | ... | - |
| ABC SCAN | SCAN | STANDARD-INSTALLED APP | CLOUD | ... | 4 |
| XXX FAX | FAX | STANDARD-INSTALLED APP | MFP | ... | 1 |
| DEF SCAN | SCAN | STANDARD-INSTALLED APP | EMAIL | ... | 6 |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-141454 filed Jul. 21, 2017.

BACKGROUND

Technical Field

The present invention relates to an information processing apparatus and a non-transitory computer readable medium.

SUMMARY

According to an aspect of the invention, there is provided an information processing apparatus including an extraction unit, an acquisition unit, and a presentation unit. The extraction unit extracts pieces of characteristic information of an initialization target program to be installed and initialized. The acquisition unit acquires at least one set value for initializing the initialization target program from at least one different program that has been installed. The acquisition unit acquires the set value in an ascending order of priorities assigned to the multiple different programs in accordance with a degree of matching in the pieces of characteristic information extracted by the extraction unit. The presentation unit presents the set value acquired by the acquisition unit.

BRIEF DESCRIPTION OF THE DRAWINGS

An exemplary embodiment of the present invention will be described in detail based on the following figures, wherein:

FIG. 4 is a diagram illustrating an example of an extraction condition table stored in an extraction-condition table memory;

FIG. 9 is a diagram illustrating example priorities assigned to multiple setting items for initialization;

FIG. 12 is a diagram illustrating an example result of comparison in characteristic information between an initialization target application and applications already installed;

DETAILED DESCRIPTION

An exemplary embodiment of the present invention will be described in detail with reference to the drawings.

Figure 1:
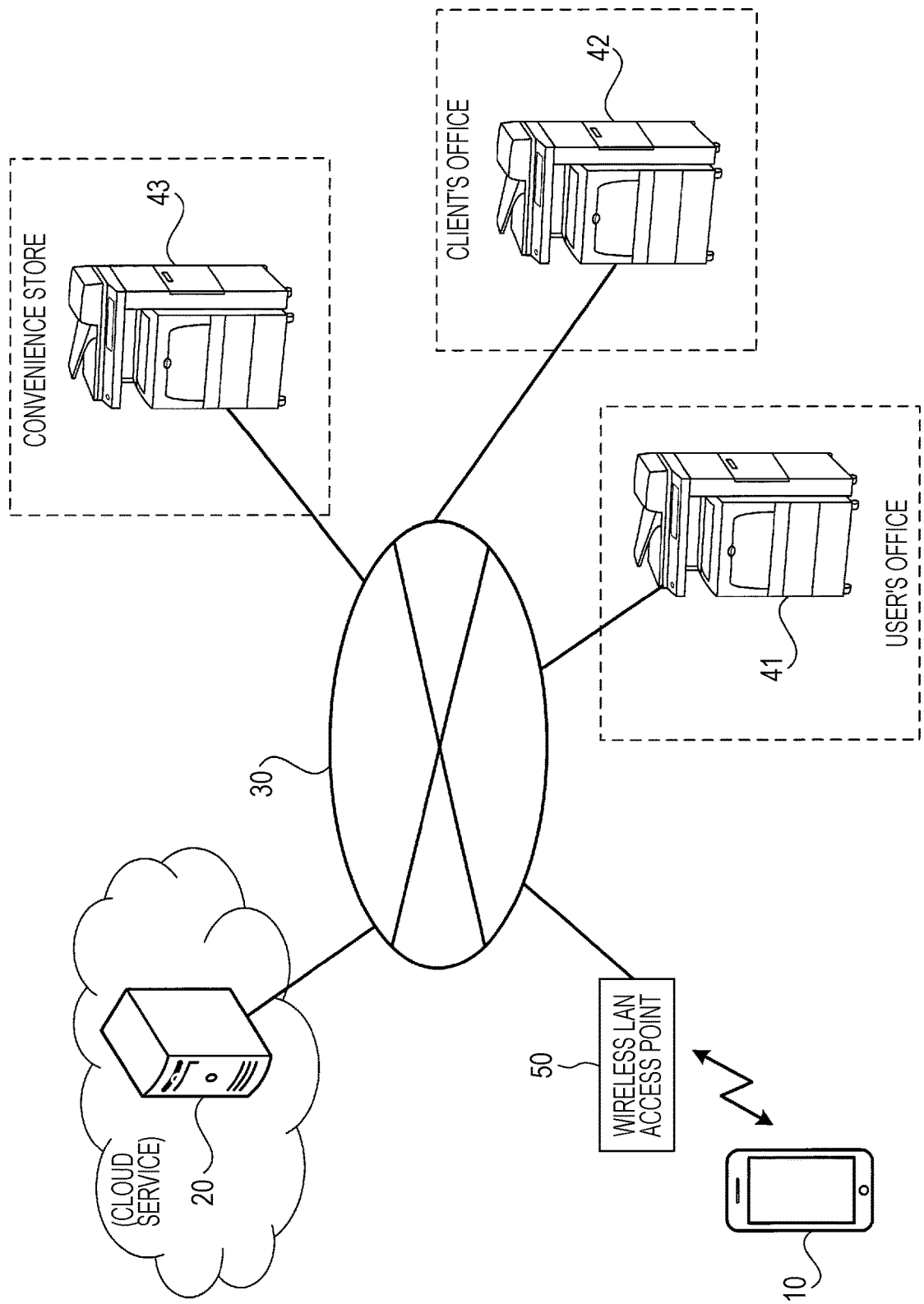
FIG. 1 is a diagram illustrating the configuration of a printing system according to an exemplary embodiment of the invention.

FIG. 1 is a diagram illustrating the configuration of a printing system according to the exemplary embodiment.

The printing system according to the exemplary embodiment includes three image forming apparatuses 41, 42, and 43 mutually connected via the Internet 30, a management server 20, a wireless LAN access point 50, and a mobile terminal apparatus 10, as illustrated in FIG. 1.

The image forming apparatuses 41 to 43 are multifunction printers (MFP) having multiple functions such as a printing function, a scanning function, a copying function, and a faxing function. For example, the image forming apparatuses 41 to 43 are respectively installed in the office of a user, the office of a client of the user, and a convenience store.

The mobile terminal apparatus 10 is a mobile information processing apparatus such as a smartphone, a tablet terminal apparatus, or a wearable apparatus each of which is held by the user and is configured to allow various operations to be performed on the image forming apparatuses 41 to 43 via the wireless LAN access point 50 and the Internet 30.

Various application programs (hereinafter, abbreviated as apps) for causing the image forming apparatuses 41 to 43 to execute various jobs such as a printing instruction are installed in the mobile terminal apparatus 10. The user selects and runs one of the multiple apps installed in the mobile terminal apparatus 10 in accordance with the type of a job to be executed, the purpose of the job, or the like and thereby gives an instruction to the image forming apparatuses 41 to 43.

The image forming apparatuses 41 to 43 receive various jobs such as a printing instruction transmitted from the mobile terminal apparatus 10 and executes processes in accordance with the respective received jobs.

The management server 20 stores document data such as print data and scan data and various pieces of app data for operating the image forming apparatuses 41 to 43. The mobile terminal apparatus 10 is designed to access the management server 20 and thereby to be allowed to transmit and receive the app data and the document data.

Even though apps installed in the mobile terminal apparatus 10 have the same function, various different apps are used in accordance with the usage or purpose. For example, as printing-related apps for a printing process, different apps are used depending on the purposes. For example, an app named Simple Printing is used to execute a printing process with only one touch, and an app named Detail Setting Printing is used to execute a printing process with detailed printing setting items. In addition, in apps for a scanning process, different apps are used depending on the purposes. For example, an app named Cloud Scan is used to store scan data in the management server 20 that provides a cloud service, and an app named Box Scan is used to store scan data in a memory device or a box of an image forming apparatus having performed scanning.

When intending to install a new app in the mobile terminal apparatus 10, the user downloads an app and data from the management server 20 to the mobile terminal apparatus 10, sets various set values for the downloaded app, and initializes the app. The app is then made usable.

Operations performed when an app is installed in the mobile terminal apparatus 10 and then initialized will be described in this exemplary embodiment. Note that the installed app may be initialized after the app is downloaded from the management server 20, after the app is initially run, or after settings of the app is changed after the initial running.

Figure 2:
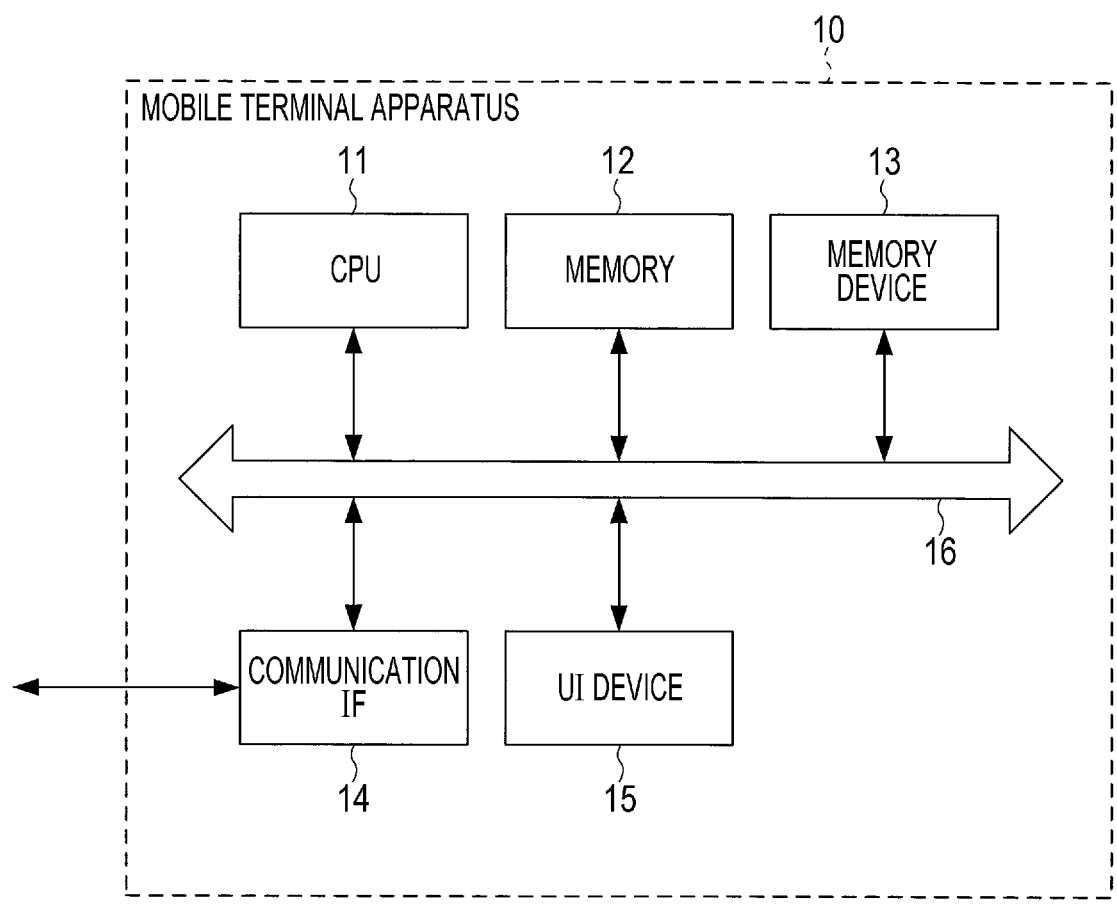
FIG. 2 is a diagram illustrating the hardware configuration of a mobile terminal apparatus according to the exemplary embodiment.

FIG. 2 illustrates the hardware configuration of the mobile terminal apparatus 10 in the printing system according to this exemplary embodiment.

As illustrated in FIG. 2, the mobile terminal apparatus 10 includes a central processing unit (CPU) 11, a memory 12, a memory device 13 such as a flash memory, a communication interface (IF) 14 that transmits and receives data to and from an external apparatus or another apparatus, and a user interface (UI) device 15 such as a touch panel or a liquid crystal display. These components are connected to each other via a control bus 16.

The CPU 11 executes a predetermined process in accordance with a control program stored in the memory 12 or the memory device 13 and thereby controls the operations of the mobile terminal apparatus 10. Note that the CPU 11 reads and runs the control program stored in the memory 12 or the memory device 13 in the description in this exemplary embodiment, but the program may be stored in a storage medium such as a compact disc read-only memory (CD-ROM) and may be provided to the CPU 11.

Figure 3:
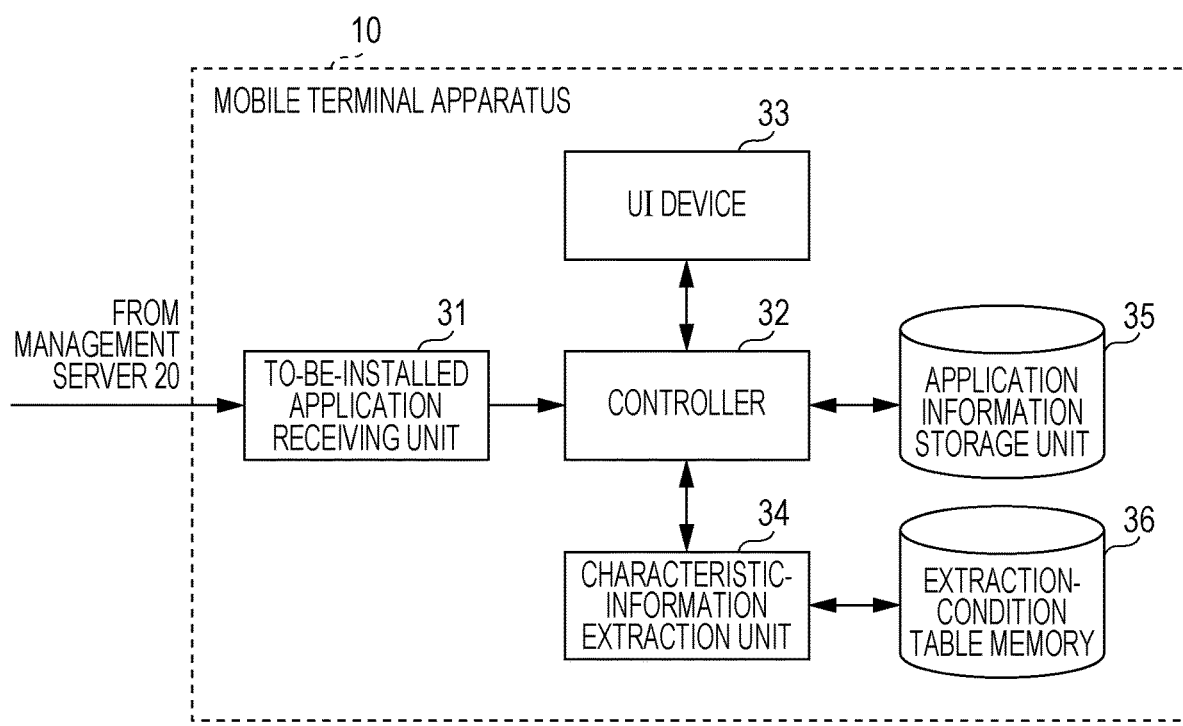
FIG. 3 is a block diagram illustrating the functional configuration of the mobile terminal apparatus according to the exemplary embodiment.

FIG. 3 is a block diagram illustrating the functional configuration of the mobile terminal apparatus 10 implemented by running the control program described above.

As illustrated in FIG. 3, the mobile terminal apparatus 10 according to this exemplary embodiment includes a to-be-installed application receiving unit 31, a controller 32, a UI device 33, a characteristic-information extraction unit 34, an application information storage unit 35, and an extraction-condition table memory 36.

The application information storage unit 35 stores various pieces of information regarding apps already installed in the mobile terminal apparatus 10.

The to-be-installed application receiving unit 31 receives, from the management server 20, data regarding an initialization target app to be newly installed in the mobile terminal apparatus 10.

The UI device 33 displays various pieces of information to the user and receives operation inputs from the user.

The extraction-condition table memory 36 stores an extraction condition table having pieces of information regarding characteristic information to be extracted from the initialization target app (initialization target program) to be installed and then initialized, an extraction method indicating how the characteristic information is extracted, and the like.

FIG. 4 illustrates an example of the extraction condition table stored in the extraction-condition table memory 36.

In the extraction condition table illustrated in FIG. 4, each type of characteristic information to be extracted from the initialization target app is associated with the classification item of the characteristic information, the extraction method, and the like.

For example, characteristic information named Job Function has Copy, Print, Scan, Fax, and the like set as possible classification items and is configured to be extracted by using methods such as an app name analysis, a job log analysis, a source code analysis, and the like. Likewise, types of characteristic information such as Setup Configuration, Communication Destination, and Access Method are associated with a classification item of the characteristic information, an extraction method, and the like.

The Job Function characteristic information is characteristic information regarding the function of an initialization target app. The Setup Configuration characteristic information is characteristic information regarding a setup configuration indicating whether the app has been standard-installed, that is, whether the app is a standard-installed app that has been standard-installed or an add-on app installed later in accordance with the user's intention.

Note that Setup Configuration may include, as the classification items of the characteristic information, information indicating whether the app is a limited-time app allowed to be used only for a limited time, such as a trial version, whether the app is a cooperative app needing cooperation with a different app, or whether the app is an externally installed app that is not present in a device and for which an external server is accessed.

The Communication Destination characteristic information is characteristic information regarding a target accessed by the app while the app is running. Further, the Access Method characteristic information is characteristic information regarding an access method used by the app.

Note that the Access Method characteristic information may include information regarding a communication interface used by the app to perform communication, for example, information regarding whether to communicate with an external apparatus, and information regarding whether local access without communicating with an external apparatus is performed (for example, such access by the app to a built-in hard disk drive (HDD) or a built-in web server). In addition, the Access Method characteristic information may include information regarding an authentication method and information regarding whether to include a proxy.

The characteristic-information extraction unit 34 refers to the extraction condition table stored in the extraction-condition table memory 36 and extracts the characteristic information of the initialization target app. Note that the characteristic-information extraction unit 34 extracts, from the initialization target app, at least two pieces of characteristic information among the multiple pieces of characteristic information as illustrated in FIG. 4.

A specific example of a characteristic information extraction process executed by the characteristic-information extraction unit 34 will be described with reference to FIGS. 5 to 8.

Figure 5:
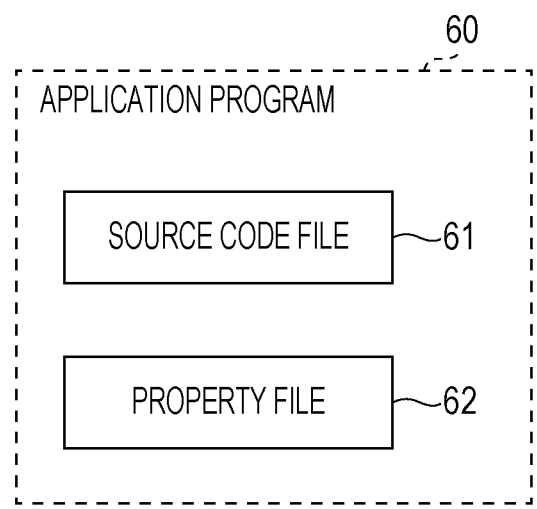
FIG. 5 is a diagram for explaining the structure of typical application data.

First, the structure of typical app data will be described with reference to FIG. 5. As illustrated in FIG. 5, an application program 60 includes a source code file 61 having body data of the app and a property file 62 having attribute information of the app.

Figure 6:
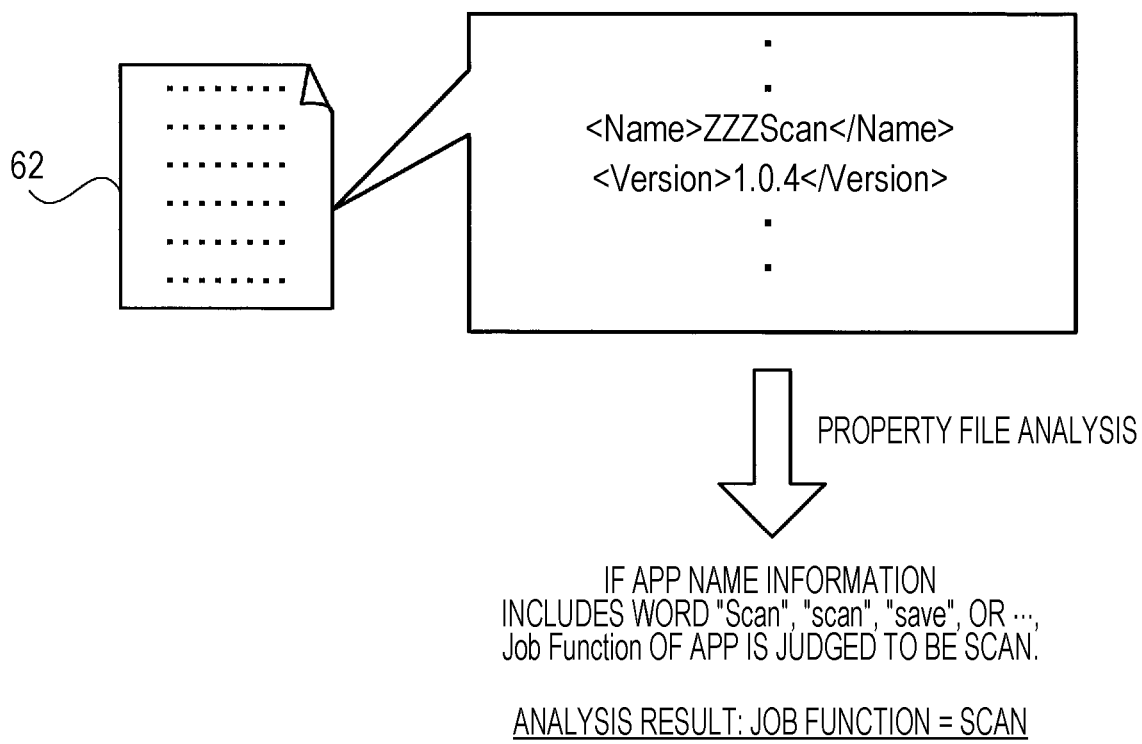
FIG. 6 is a diagram for explaining a specific example in which a characteristic-information extraction unit extracts characteristic information regarding Job Function from an application to be initialized (initialization target application)

FIG. 6 illustrates a specific example in which the characteristic-information extraction unit 34 extracts the Job Function characteristic information from an initialization target app. FIG. 6 illustrates a case where the characteristic-information extraction unit 34 analyzes the property file 62 of the initialization target app and judges Job Function from the app name. FIG. 6 illustrates a case where if information regarding an app name in the property file 62 includes one of specific words such as "Scan", "scan", and "save", Job Function of the app is judged to be Scan.

Figure 7:
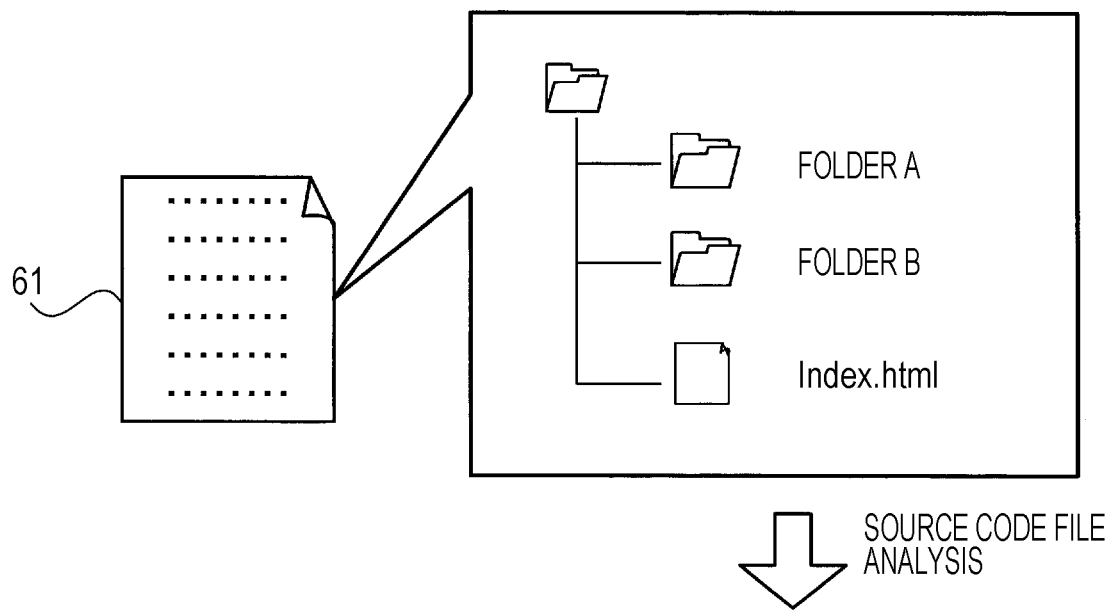
FIG. 7 is a diagram for explaining a specific example in which the characteristic-information extraction unit extracts characteristic information regarding Setup Configuration from the initialization target application.

FIG. 7 illustrates a specific example in which the characteristic-information extraction unit 34 extracts the Setup Configuration characteristic information from the initialization target app. FIG. 7 illustrates a case where the characteristic-information extraction unit 34 analyzes the source code file 61 of the initialization target app and judges the type of the app from a file structure and a file type included in the source code file 61. In FIG. 7, the source code file 61 includes a web sheet (html file), and thus Setup Configuration of the app is judged to be not a standard-installed app but an add-on app added later in accordance with the user's intention.

Figure 8:
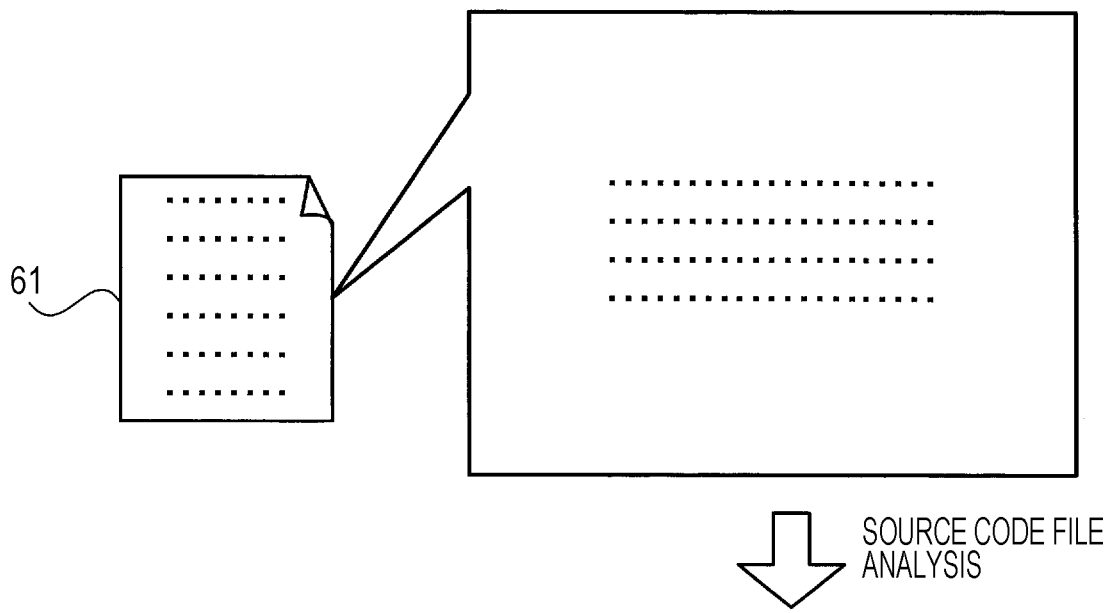
FIG. 8 is a diagram for explaining a specific example in which the characteristic-information extraction unit extracts characteristic information regarding Communication Destination from the initialization target application.

Further, FIG. 8 illustrates a specific example in which the characteristic-information extraction unit 34 extracts the Communication Destination characteristic information from the initialization target app. In FIG. 8, the characteristic-information extraction unit 34 analyzes the source code file 61 of the initialization target app and detects a program configuration in the source code file 61. The program is configured such that a scanned document is transferred to an email server through Simple MailTransfer Protocol (SMTP). Communication Destination of the app is thereby judged to be Email.

The controller 32 acquires set values for initializing the initialization target app from different apps that have been installed. The controller 32 acquires the set values in an ascending order of priorities assigned to the installed different apps in accordance with a degree of matching in the characteristic information extracted by the characteristic-information extraction unit 34. The controller 32 presents the acquired set values to the user by displaying the set values by using the UI device 33.

Specifically, the controller 32 counts, in pieces of characteristic information of each installed different app, items that each match a corresponding one of the items of the respective pieces of characteristic information extracted from the initialization target app by the characteristic-information extraction unit 34. The controller 32 acquires set values for initializing the initialization target app in the ascending order of the priorities assigned to the installed different apps in accordance with the count of the matching items of the respective pieces of characteristic information.

Note that if a set value of a setting item is not acquirable from the highest priority app, the controller 32 acquires a set value of the setting item from the second priority app.

Specifically, the controller 32 does not acquire all of the set values for initializing the initialization target app from one installed app. Instead, to acquire the set values for initializing the initialization target app from the multiple installed apps, the controller 32 acquires each set value of a corresponding one of the setting items from among the different apps.

Further, if a set value for initializing the initialization target app is not acquirable from any one of the installed apps, the controller 32 acquires, as the set value for initializing the initialization target app, a recommended set value set in advance. For example, it is conceivable to register, as the recommended set value, a set value set in advance on the basis of the department, organization, or job type of the user of the app, or a set value most frequently used among set values used by different users.

After acquiring the set values for initializing the initialization target app in this manner, the controller 32 initializes the initialization target app on the basis of the acquired set values.

Note that the controller 32 judges an app with a high degree of matching in characteristic information with the initialization target app in the following manner. Specifically, if an app has a higher count of the items of the respective pieces of characteristic information that each match a corresponding one of the items of the respective pieces of characteristic information of the initialization target app, the controller 32 judges that the app has a higher degree of matching. The controller 32 then acquires the set values for initializing the initialization target app.

Specifically, the controller 32 counts, in pieces of characteristic information of each installed different app, items that each match a corresponding one of the items of the respective pieces of characteristic information of the initialization target app. The controller 32 acquires the set values for initializing the initialization target app in the ascending order of the priorities assigned to the installed different apps in accordance with the count of matching items of the respective pieces of characteristic information.

If there are multiple apps having identical counts of the items of the respective pieces of characteristic information that each match a corresponding one of the items of the respective pieces of characteristic information of the initialization target app, the controller 32 acquires, as a set value for initializing the initialization target app, a set value set in a high proportion among the set values of the multiple apps having the identical counts of the matching items of the respective pieces of characteristic information.

Alternatively, if there are multiple apps having identical counts of the items of the respective pieces of characteristic information that each match a corresponding one of the items of the respective pieces of characteristic information of the initialization target app, the controller 32 acquires, as a set value for initializing the initialization target app, a set value set in an app frequently used by the user or most recently used by the user among the set values of the multiple apps having the identical counts of the matching items of the respective pieces of characteristic information.

Note that to judge the degree of matching with the initialization target app, the controller 32 does not have to use the count of the items of the respective pieces of characteristic information that each match a corresponding one of the items of the respective pieces of characteristic information of the initialization target app. Instead, if an app has a higher total value of weighting coefficients for the items of the respective pieces of characteristic information that each match a corresponding one of the items of the respective pieces of characteristic information of the initialization target app, the controller 32 may judge that the app has a higher degree of matching.

Further, if the acquired set values are incompatible, the controller 32 changes one of the set values that is assigned a lower priority and thereby eliminates the incompatibility. The set values are assigned priorities in advance.

FIG. 9 illustrates example priorities assigned to multiple setting items for the initialization. The controller 32 stores a priority table as illustrated in FIG. 9. If the set values of two respective setting items are incompatible, the controller 32 keeps the set value of the higher-priority setting item and changes the set value of the lower-priority setting item to eliminate the incompatibility.

If an acquired set value is not settable in the initialization target app, the controller 32 changes the acquired set value to a value settable in the initialization target app.

Figure 10:
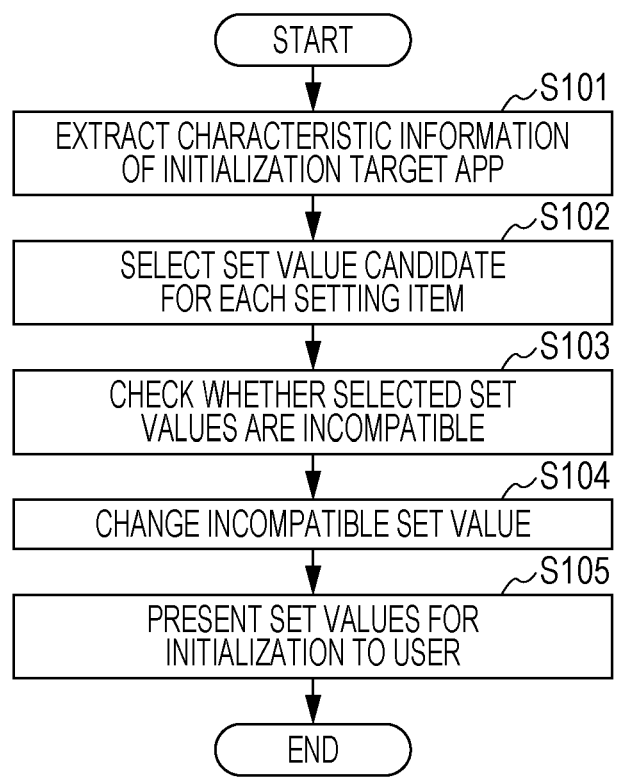
FIG. 10 is a flowchart for explaining operations performed when a new application is installed in the mobile terminal apparatus according to the exemplary embodiment.

Operations performed when a new app is installed in the mobile terminal apparatus 10 according to this exemplary embodiment will be described with reference to a flowchart in FIG. 10.

Figure 11:
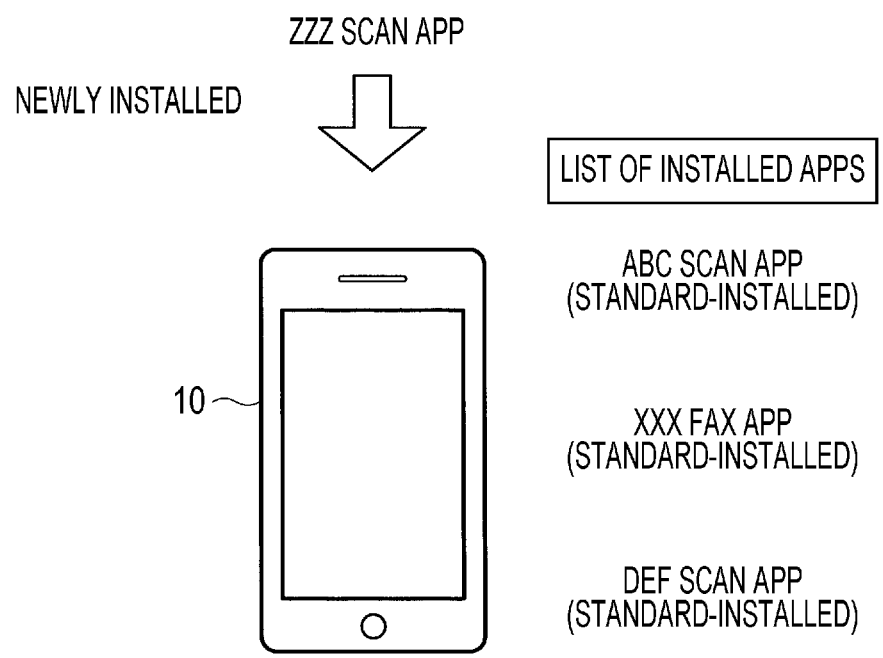
FIG. 11 is a diagram for explaining a case where an application named ZZZ Scan is to be newly installed in a state where applications respectively named ABC Scan, XXX Fax, and DEF Scan have been installed in the mobile terminal apparatus.

In the description below, an app named ZZZ Scan is to be newly installed in a state where apps respectively named ABC Scan, XXX Fax, and DEF Scan have been installed in the mobile terminal apparatus 10, as illustrated in FIG. 11.

First, after the to-be-installed application receiving unit 31 receives the app data of the ZZZ Scan app from the management server 20, the characteristic-information extraction unit 34 extracts pieces of characteristic information set in the extraction condition table from the ZZZ Scan app that is the initialization target app (step S101).

The controller 32 compares the characteristic information of the initialization target app extracted by the characteristic-information extraction unit 34 with the characteristic information of the installed apps. The application information storage unit 35 stores therein pieces of characteristic information of apps as pieces of app information regarding the installed apps. However, the pieces of characteristic information of the apps do not have to be stored in the application information storage unit 35. Instead, every time a new app is installed, the characteristic-information extraction unit 34 may also extract the pieces of characteristic information of the installed apps.

FIG. 12 illustrates an example result of comparison in characteristic information between the initialization target app and the installed apps as described above.

From the ZZZ Scan app that is the initialization target app, the characteristic-information extraction unit 34 has herein extracted, as pieces of characteristic information, Scan for Job Function, Add-on Application for Setup Configuration, and Email for Communication Destination.

Among the classification items of the pieces of characteristic information of the installed apps, classification items that each match a corresponding one of the classification items of the respective pieces of characteristic information of the ZZZ Scan app that is the initialization target app are illustrated in hatched parts in FIG. 12. For example, the Job Function characteristic information of the ZZZ Scan app has the Scan item, and Job Function of the ABC Scan and DEF Scan apps also have Scan. Accordingly, Scan is hatched.

Items of the respective pieces of characteristic information that each match the content of the items of the ZZZ Scan app that is the initialization target app as described above are counted for each installed app, and thereby the count of items each matching the corresponding one of the items of the initialization target app is obtained.

In the example illustrated in FIG. 12, the ABC Scan app has the count of matching items (the count of matches) of 4, the XXX Fax app has the count of matching items of 1, and the DEF Scan app has the count of matching items of 6.

The controller 32 refers to a comparison result of the characteristic information as described in FIG. 12 and selects set value candidates (import candidate set values) for the setting items for initializing the initialization target app (step S102).

An example of selecting the import candidate set values for the respective setting items will be described with reference to FIG. 13.

Figure 13:
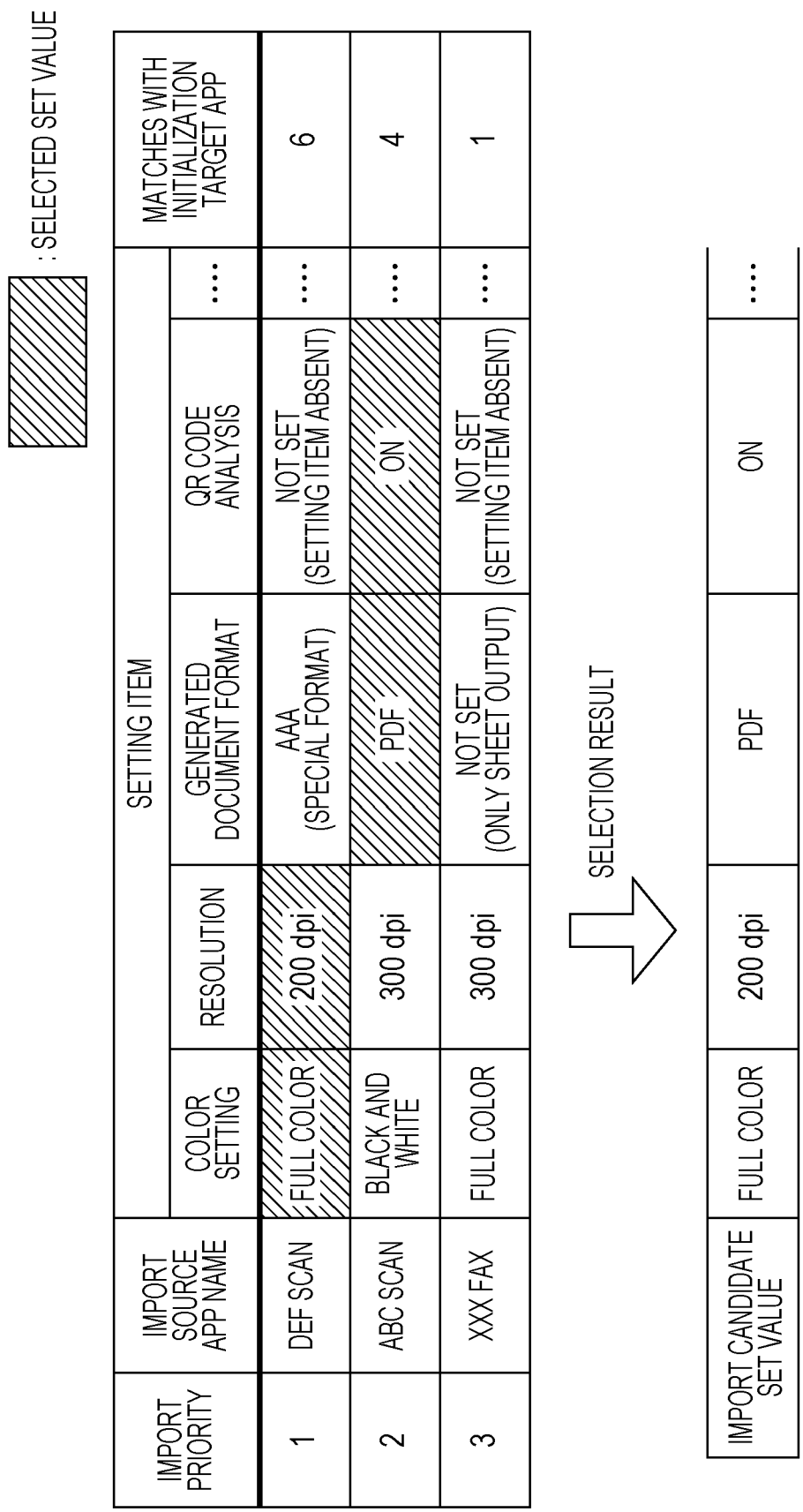
FIG. 13 is a diagram for explaining an example of selecting an import candidate set value for each setting item.

First, as illustrated in FIG. 13, the controller 32 sorts the apps in the descending order of the counts of items each matching a corresponding one of the items of the initialization target app in the comparison result in FIG. 12 to assign a higher priority to a higher count. In FIG. 13, priorities are assigned to the DEF Scan app with the count of matches of 6, the ABC Scan app with the count of matches of 4, and the XXX Fax app with the count of matches of 1 in this order from the highest.

With reference to FIG. 13, a case where set values for Color Setting, Resolution, Generated Document Format, QR Code (registered trademark) Analysis . . . that are the setting items for initializing the initialization target app are selected will be described.

Specifically, the controller 32 acquires set values for initializing the initialization target app from the installed different apps. The controller 32 acquires the set values in the ascending order of the priorities assigned in accordance with the degree of matching in the characteristic information extracted by the characteristic-information extraction unit 34.

For example, for Color Setting, the controller 32 selects Full Color that is a set value of the DEF Scan app assigned the highest priority. For Resolution, the controller 32 selects 200 dpi that is a set value of the DEF Scan app assigned the highest priority.

However, regarding Generated Document Format, the AAA format that is a set value of the DEF Scan app assigned the highest priority is a special format and thus is not supported by the ZZZ Scan app that is the initialization target app. Accordingly, for Generated Document Format, the controller 32 selects PDF that is a set value of the ABC Scan app assigned the second highest priority.

For QR Code Analysis, the DEF Scan app assigned the highest priority does not support the function and thus does not have a setting item. Accordingly, for QR Code Analysis, the controller 32 selects On that is a set value of the ABC Scan app assigned the second highest priority.

Note that in FIG. 13, the set values selected as candidates for the initialization (import candidate set values) in this manner are illustrated in the hatched parts.

The controller 32 then checks whether the selected set values are incompatible (step S103). The description is herein provided on the assumption that the resolution of 300 dpi or higher is needed to set On for the QR code analysis function.

Specifically, a set value of 200 dpi for the Resolution setting item and a set value of On of the QR Code Analysis setting item are incompatible. Accordingly, the controller 32 changes one of the set values assigned a lower priority set in advance and thereby eliminates the incompatibility (step S104).

An example of a process for checking whether the import candidate set values are incompatible and for changing one of the set values will be described with reference to FIG. 14.

Since the setting items are assigned the priorities as illustrated in FIG. 9, QR Code Analysis is assigned a higher priority than Resolution.

Figure 14:
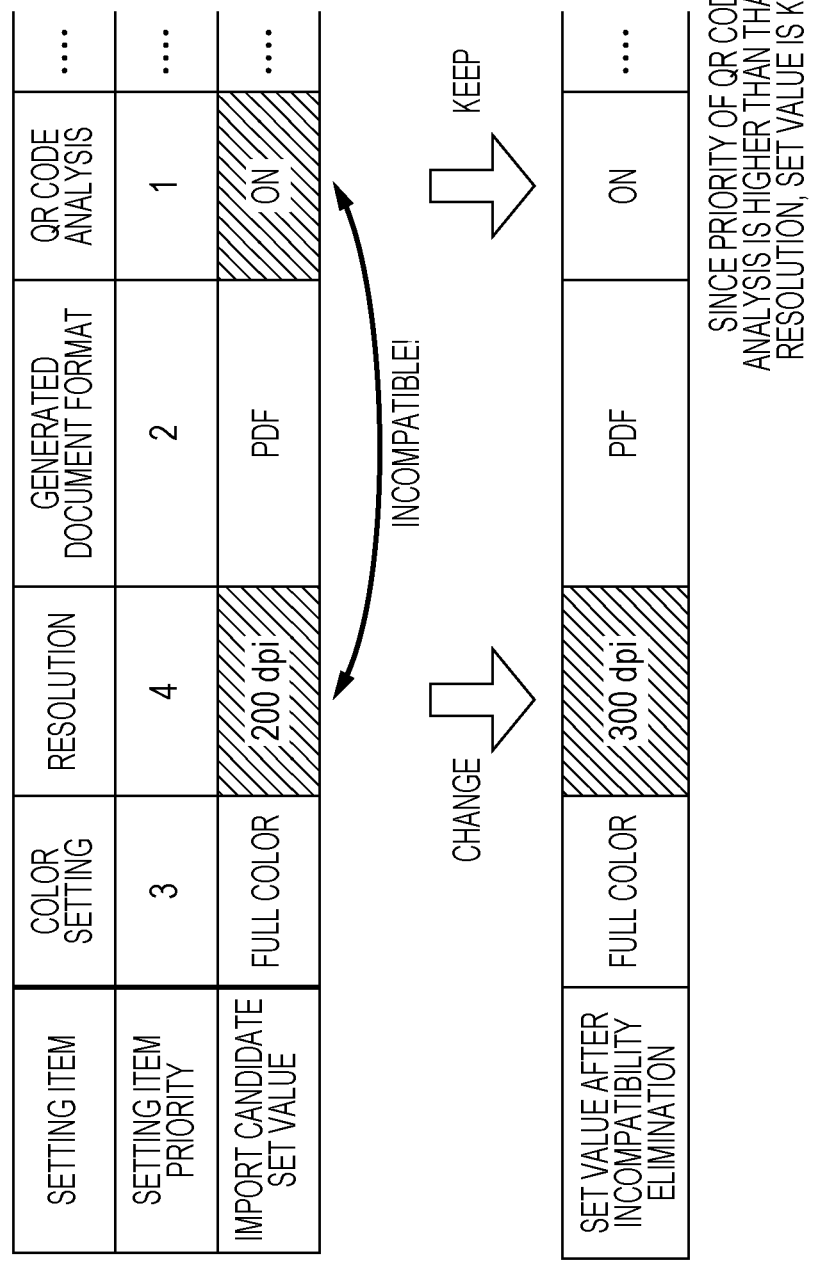
FIG. 14 is a diagram for explaining a process for checking whether import candidate set values are incompatible and for changing one of the set values.

Accordingly, as illustrated in FIG. 14, the controller 32 preferentially keeps the On set value for QR Code Analysis and changes the set value of 200 dpi for Resolution to the set value of 300 dpi by which the incompatibility is eliminated.

The controller 32 presents, to the user, the set values determined in this manner as the set values for initializing the initialization target app (step S105).

Example cases where the determined set values are presented to the user on the display of the mobile terminal apparatus 10 will be described with reference to FIGS. 15 to 18.

Figure 15:
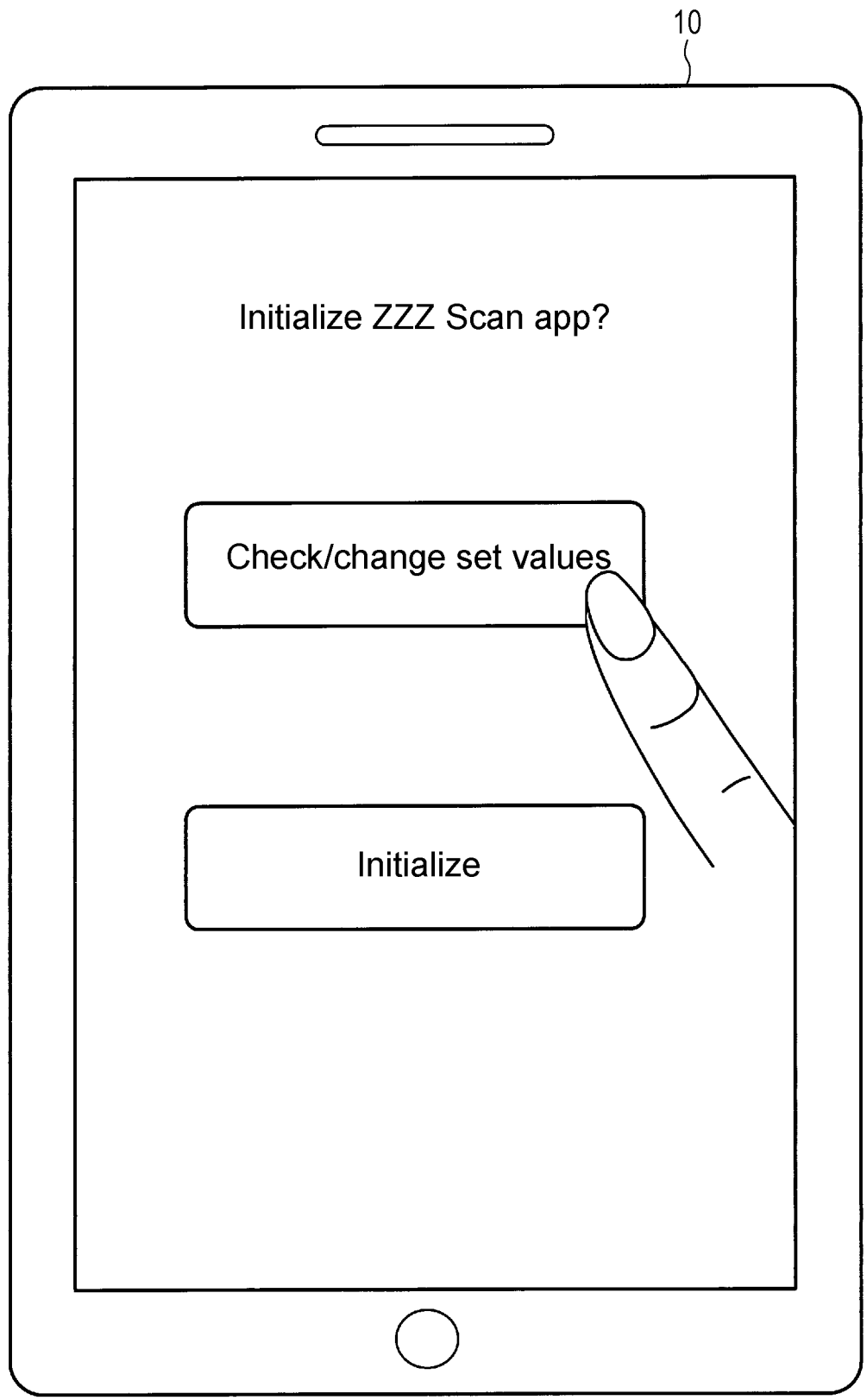
FIG. 15 is a diagram illustrating an example of displaying a check screen on which the set values for initialization of an application are presented before the initialization.

FIG. 15 illustrates an example case where a check screen on which set values for initialization are presented is displayed before the initialization of an app. FIG. 15 illustrates a message "Initialize ZZZ Scan app?", the Check/change set values button, and the Initialize button.

If the user intends to check the set values and to change any of the set values depending on the case, tapping the Check/change set values button enables the set values for the initialization to be checked. If the user does not intend to check the set values, tapping the Initialize button causes the initialization to be started immediately with the decided set values.

Figure 16:
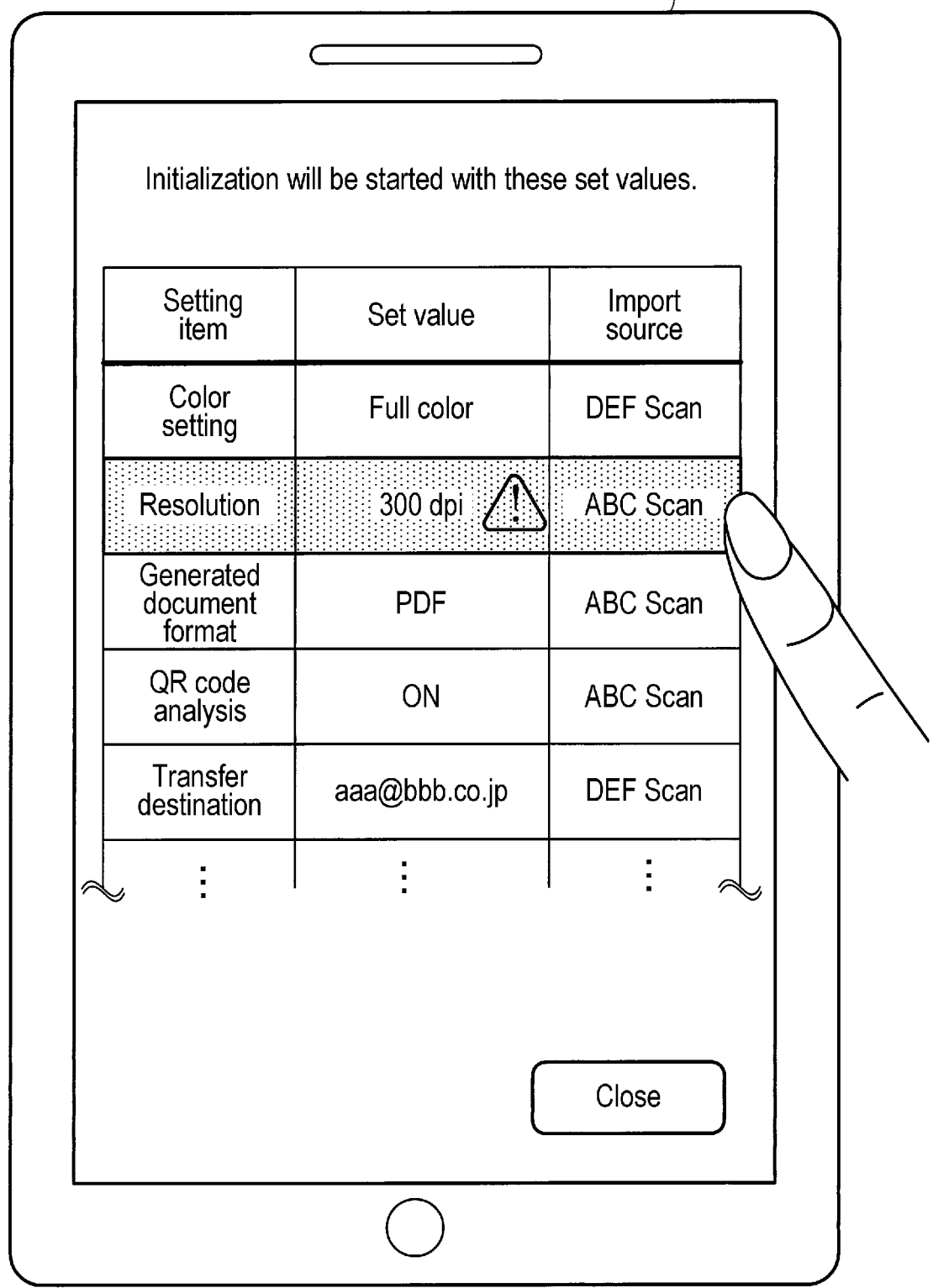
FIG. 16 is a diagram illustrating an example screen displayed after a Check/change set values button is tapped on the example display screen illustrated in FIG. 15.

FIG. 16 illustrates an example screen displayed after the Check/change set values button is tapped on the example display screen illustrated in FIG. 15. FIG. 16 illustrates set values to be used for the initialization together with pieces of import-source information respectively indicating apps from which the respective set values come. Note that a setting item and a set value forcibly changed after the controller 32 judges that set values are incompatible are displayed in such a manner as to be noticeable to the user such as by changing the color to be discriminated from the other setting items and set values, or providing alert display. In the example display screen illustrated in FIG. 16, the set value of 300 dpi for Resolution is changed by the controller 32 and is thus displayed to indicate to that effect.

Figure 17:
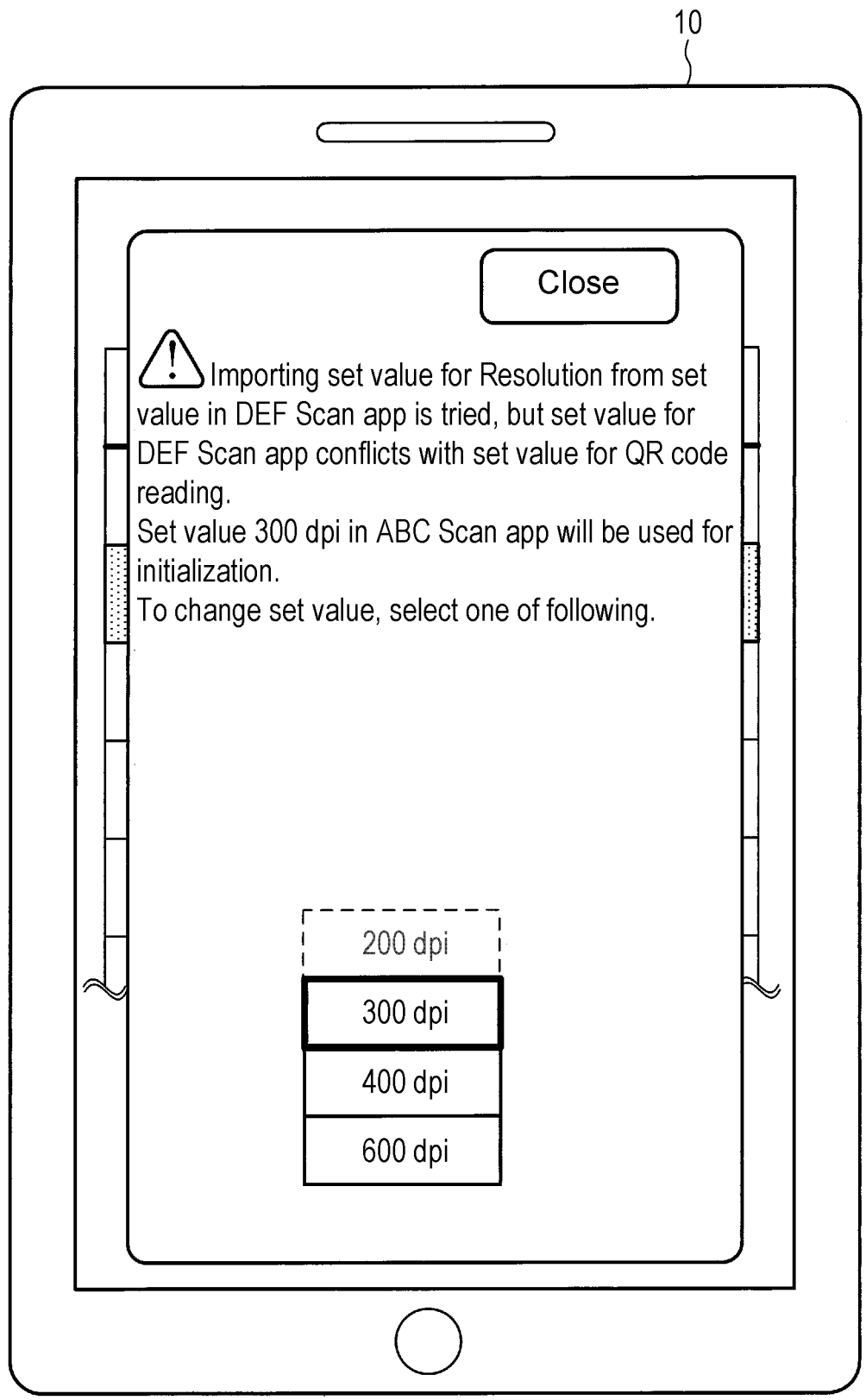
FIG. 17 is a diagram illustrating an example screen displayed after Resolution is tapped on the example display screen illustrated in FIG. 16.

If the user taps Resolution at this time, the reason why the set value has been changed as illustrated FIG. 17 is displayed. FIG. 17 illustrates the reason why the set value for Resolution has been changed from 200 dpi to 300 dpi. In FIG. 17, display enabling the user to change the resolution to 400 dpi or 600 dpi is provided.

Although FIG. 15 illustrates the example case where the check screen on which the set values to be used for the initialization is displayed before the initialization of an app, the set values used for an initialization process may be presented on the check screen to the user as an ex post facto report after executing the initialization process.

Figure 18:
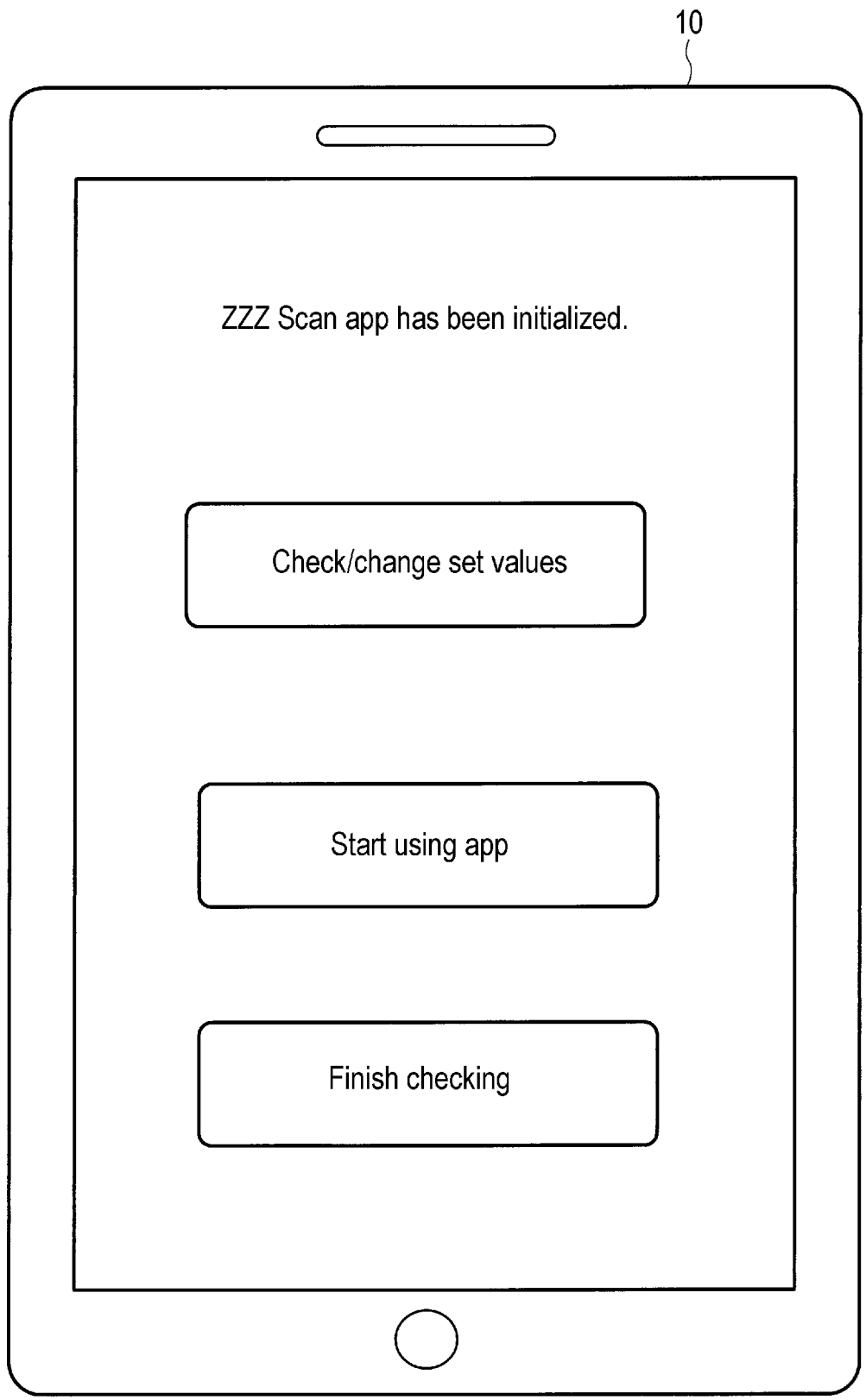
FIG. 18 is a diagram illustrating an example screen displayed when the check screen is displayed after the application is initialized.

FIG. 18 illustrates an example screen displayed when the check screen is displayed in this manner after the app is initialized. Compared with the display screen example illustrated in FIG. 15, FIG. 18 illustrates a case where the Start using app button and the Finish checking button are displayed instead of the Initialize button. If the user intends to see the details of the set values used for the initialization, the user may tap the Check/change set values button. If the user thinks that they need not to see the details of the set values used for the initialization, they may tap the Finish checking button. Further, if the user needs not to see the details of the set values used for the initialization and intends to use the app immediately, they may tap the Start using app button.

Modification

In the exemplary embodiment, the case where a program such as an application program is installed in an information processing apparatus such as the mobile terminal apparatus 10 and then initialized has been described. However, the present invention is not limited to this exemplary embodiment. The present invention is likewise applicable to a case where a program for implementing characteristic processing is installed in an information processing apparatus other than the mobile terminal apparatus and then initialized.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor that is configured to:
   extract pieces of characteristic information of an initialization target program to be installed and initialized;
   acquire at least one set value for initializing the initialization target program from at least one different program that has been installed, the processor acquiring the set value in an ascending order of priorities assigned to a plurality of the different programs in accordance with a degree of matching in the pieces of characteristic information extracted;
   present the set value acquired, wherein it one of the different programs has a higher count of matching items of respective pieces of characteristic information, the matching items each matching a corresponding one of the items of the respective pieces of characteristic information of the initialization target program, the one of the different programs is judged to have a higher degree of matching and the set value for initializing the initialization target program is acquired; and
   initialize the initialization target program by using the set value acquired.

2. The information processing apparatus according to claim 1,
   wherein if a set value of one of setting items is not acquirable from one of the different programs that is assigned a highest priority, a set value of the setting item is acquired from one of the different programs that is assigned a second priority.

3. The information processing apparatus according to claim 2,
   wherein to acquire the set value for initializing the initialization target program from the plurality of different programs that have been installed, a set value of one of the setting items is acquired from among the different programs.

4. The information processing apparatus according to claim 2,
   wherein if the set value for initializing the initialization target program is not acquirable from any one of the different programs that have been installed, a recommended set value, as the set value for initializing the initialization target program, is set in advance is acquired.

5. The information processing apparatus according to claim 1,
wherein if the different programs include a plurality of different programs having identical counts of the matching items of the respective pieces of characteristic information that each match the corresponding one of the items of the respective pieces of characteristic information of the initialization target program, acquired is a set value, as the set value for initializing the initialization target program, in a high proportion among set values of the plurality of different programs having the identical counts of the matching items of the respective pieces of characteristic information.

6. The information processing apparatus according to claim 1,
wherein if the different programs include a plurality of different programs having identical counts of the matching items of the respective pieces of characteristic information each match the corresponding one of the items of the respective pieces of characteristic information of the initialization target program, acquired is a set value, as the set value for initializing the initialization target program, set in a different program frequently used by a user or most recently used by the user among the set values of the plurality of different programs having the identical counts of the matching items of the respective pieces of characteristic information.

7. The information processing apparatus according to claim 1,
wherein if one of the different programs has a higher total value of weighting coefficients for matching items of respective pieces of characteristic information, the matching items each matching a corresponding one of the items of the respective pieces of characteristic information of the initialization target program, the one of the different programs is judged to be a higher degree of matching and the set value for initializing the initialization target program is acquired.

8. The information processing apparatus according to claim 1, wherein the processor is further configured for:
changing a set value with a lower priority among a plurality of the set values acquired if the set values are incompatible, the lower priority being one of priorities that are set in advance.

9. The information processing apparatus according to claim 1, wherein the processor is further configured for:
changing the set value acquired if the acquired set value is not settable in the initialization target program.

10. The information processing apparatus according to claim 1,
wherein the pieces of characteristic information extracted are at least two of characteristic information regarding a function of the initialization target program, characteristic information indicating a setup configuration, characteristic information regarding an access target, and characteristic information regarding an access method.

11. A non-transitory computer readable medium causing a computer to execute a process comprising:
extracting pieces of characteristic information of an initialization target program to be installed and initialized;
acquiring a set value for initializing the initialization target program from at least one different program that has been installed, the set value being acquired in an ascending order of priorities assigned to a plurality of the different programs in accordance with a degree of matching in the pieces of characteristic information extracted in the extracting of the pieces of characteristic information;
if one of the different programs has a higher count of matching items of respective pieces of characteristic information, the matching items each marching a corresponding one of the items of the respective pieces of characteristic information of the initialization target program, judging that the one of the different programs has a higher degree of matching and acquiring the set value for initializing the initialization target program;
presenting the set value acquired in the acquiring of the set value; and
initializing the initialization target program by using the set value acquired.

12. A method comprising:
extracting pieces of characteristic information of an initialization target program to be installed and initialized;
acquiring at least one set value for initializing the initialization target program from at least one different program that has been installed, the set value being acquired in an ascending order of priorities assigned to a plurality of the different programs in accordance with a degree of matching in the pieces of characteristic information extracted in the extracting of the pieces of characteristic information;
if one of the different programs has a higher count of matching items of respective pieces of characteristic information, the matching items each matching a corresponding one of the items of the respective pieces of characteristic information of the initialization target program, judging that the one of the different programs has a higher degree of matching and acquiring the set value for initializing the initialization target program; and
presenting the set value acquired by the acquisition means; and
initializing the initialization target program by using the set value acquired.

\* \* \* \* \*